(12) United States Patent
Norberg et al.

(10) Patent No.: US 8,207,437 B2
(45) Date of Patent: Jun. 26, 2012

(54) HAND-HELD COMPUTING DEVICE WITH BUILT-IN DISC-JOCKEY FUNCTIONALITY

(75) Inventors: Jonas Norberg, Stockholm (SE); Joar Sörman, Stockholm (SE); Erik Runeland, Sollentuna (SE)

(73) Assignee: Idebyran S AB, Stockholm (SE)

( * ) Notice: Subject to any disclaimer, the term of this patent is extended or adjusted under 35 U.S.C. 154(b) by 1190 days.

(21) Appl. No.: 11/908,973

(22) PCT Filed: Mar. 15, 2006

(86) PCT No.: PCT/SE2006/050030
§ 371 (c)(1),
(2), (4) Date: Dec. 27, 2007

(87) PCT Pub. No.: WO2006/098693
PCT Pub. Date: Sep. 21, 2006

(65) Prior Publication Data
US 2008/0205681 A1    Aug. 28, 2008

Related U.S. Application Data

(60) Provisional application No. 60/594,201, filed on Mar. 18, 2005.

(51) Int. Cl.
*G10H 1/00* (2006.01)
(52) U.S. Cl. ............... 84/605; 84/612; 84/625; 84/636; 700/94; 381/119
(58) Field of Classification Search ........... 84/612, 84/625, 636, 652, 660, 605; 700/94; 381/119
See application file for complete search history.

(56) References Cited

U.S. PATENT DOCUMENTS

| 6,769,689 | B1 * | 8/2004 | Shimomura et al. | 273/148 B |
| 6,933,432 | B2 * | 8/2005 | Shteyn et al. | 84/609 |
| 7,526,181 | B2 * | 4/2009 | Burges et al. | 386/344 |

(Continued)

FOREIGN PATENT DOCUMENTS

GB          2411279 A      8/2005
(Continued)

OTHER PUBLICATIONS

Anonymous: "OODJ" Internet Article, [Online], Mar. 11, 2005, XP002385672 Retrieved from the internet: URL:http://web.archive.org/web/20050311015140/http://www.pcdjhardware.com/oodj1.asp> [retrieved on Jun. 16, 2006].

(Continued)

*Primary Examiner* — David S. Warren
(74) *Attorney, Agent, or Firm* — Schiff Hardin LLP

(57) ABSTRACT

A small compact easy to handle device with disc-jockey functionality is proposed, comprising a housing, loudspeaker system output means (23) for providing a loud-speaker sound output to at least one loudspeaker system, a display (13), means for 5 providing at least a first channel or at least a second channel as the loudspeaker sound output said computing device being characterized in that the housing is dimensioned to be handheld by a user and that it comprises—selection means (13) for selecting one of the first and second channel 10—control means (14, 18) comprising an input means for controlling at least one characteristic of the selected channel selected from the group of bend and playback speed—cross-fading means (16) for cross-fading between the first and the second channel independently of the selected channel, said cross-fading means ena- 15 bling cross-fading by using one input means.

21 Claims, 2 Drawing Sheets

U.S. PATENT DOCUMENTS

| | | | |
|---|---|---|---|
| 7,952,535 B2 * | 5/2011 | Watanabe et al. | 345/2.2 |
| 2001/0017829 A1 * | 8/2001 | Inoue et al. | 369/47.23 |
| 2001/0017832 A1 * | 8/2001 | Inoue et al. | 369/53.34 |
| 2002/0118848 A1 | 8/2002 | Karpenstein | |
| 2002/0136419 A1 * | 9/2002 | Santos | 381/119 |
| 2002/0176327 A1 * | 11/2002 | Yamada et al. | 369/30.26 |
| 2003/0039373 A1 | 2/2003 | Lawson et al. | |
| 2003/0076751 A1 * | 4/2003 | Miyashita et al. | 369/30.11 |
| 2003/0103422 A1 * | 6/2003 | Miyashita et al. | 369/30.23 |
| 2003/0183064 A1 * | 10/2003 | Eugene et al. | 84/609 |
| 2004/0190409 A1 * | 9/2004 | Inoue et al. | 369/47.1 |
| 2004/0254660 A1 * | 12/2004 | Seefeldt | 700/94 |
| 2005/0259532 A1 * | 11/2005 | Roman et al. | 369/47.1 |
| 2006/0092282 A1 * | 5/2006 | Herley et al. | 348/207.99 |
| 2008/0013757 A1 * | 1/2008 | Carrier | 381/119 |
| 2008/0205681 A1 * | 8/2008 | Norberg et al. | 381/334 |
| 2009/0105859 A1 * | 4/2009 | Tagawa et al. | 700/94 |
| 2010/0064145 A1 * | 3/2010 | Hirota et al. | 713/193 |
| 2010/0172632 A1 * | 7/2010 | Sakata | 386/95 |
| 2010/0274373 A1 * | 10/2010 | Sakata | 700/94 |
| 2011/0252948 A1 * | 10/2011 | Humphrey | 84/625 |
| 2011/0261972 A1 * | 10/2011 | Komm | 381/74 |
| 2011/0295395 A1 * | 12/2011 | Abe et al. | 700/94 |

FOREIGN PATENT DOCUMENTS

GB    2414110 A    11/2005

OTHER PUBLICATIONS

James Humphrey: "Computer DJ 00DJ" Internet Article, [Online] No. 11, Apr. 11, 2005, pp. 48-50, XP002385673 Retrieved from the internet: URL:http://www.pcdjhardware.com/datasheets/Pro%20Mobile%20Issue%2011%20-%2000DJ%20Review.pdf> [Retrieved on Jun. 16, 2006].

Hicham Janati: "PCDJ PCDJ FX Manual—second edition" [Online] 2004, VISIONIC, XP002385679 Retrieved from the internet: URL:http://www.pcdj.com/Support/Manuals/FX%20VRM%20Manual%20for%20PCDJ.pdf> [retrieved on Jun. 16, 2006].

* cited by examiner

HAND-HELD COMPUTING DEVICE WITH BUILT-IN DISC-JOCKEY FUNCTIONALITY

CROSS REFRERENCE TO RELATED APPLICATIONS

This application is a national stage application of International Application PCT/SE2006/050030, filed 15 Mar. 2006, designating the United States of America, which claims the benefit of 60/594,201 filed 18 Mar. 2005.

TECHNICAL FIELD

The present invention relates to a hand-held computing device with built-in disc-jockey functionality and a method for using such a device.

BACKGROUND OF THE INVENTION

Disc-jockeys are often used at discotheques and other places of music/dance entertainment. Disc-jockeys (DJ) commonly use two audio tracks to eliminate the gaps between songs in order to increase the flow of music. More advanced control involves manipulating the playback speed of the audio tracks so that the transition between them can be seen as seamless, this is called beat mixing. On top of this a disc-jockey can use a whole variety of effects to manipulate the playback in order to increase the experience for the crowd. For example, the disc-jockey can manipulate the frequencies, add audio effects, manipulate the volume, and much more.

The DJ systems available today are expensive and bulky systems that very few people can afford. They normally consists of two audio playing devices capable of manipulating the playback speed, such as a DJ compact disc players or turntables; an audio mixer capable of mixing the output from the audio playing devices together; a pair of head phones, a power amplifier to amplify the output from the audio mixer; and a pair of loudspeakers. There is today also a wide range of computer programs that allow a user to mix digitally stored audio. What differentiates the computer programs from the traditional system is that the manipulation of the playback is done on the computer without any physical connection between the DJ and the tracks. However, in order to give the DJ physical control over the digitally stored audio, consoles with all the controls and inputs a DJ needs has been developed.

The basic control functions that are needed for DJ functionality include the following:

Crossfade: gradually changing from one channel to another channel by increasing the volume of one channel in at the same time as fading the other one out.

Pitch: changing the speed at which a track is played to adapt the speed of two tracks to each other.

Bend: temporarily changing the speed at which a track is played, to synchronize the beat of two tracks with each other to make a seamless transition between them.

Pause/play: to start and stop the playback of a channel.

Cue: stop playback and set the playback position to the cue point; a user set position in the track.

Traditional DJ equipment has two sets of all the application specific controls, including a pause/play and cue button, a bend control and a playback speed control for each channel and a cross fader for each audio output, that is, one for the lineout and one for the headphones.

Despite the recent advances of electronic components, the disc-jockey systems are still bulky and expensive to obtain. It is an object of the present invention to provide a disc-jockey system that is small and inexpensive while providing the same or better performance compared to traditional disc-jockey systems.

SUMMARY OF THE INVENTION

This object is achieved according to the invention by a computing device with built-in disc-jockey functionality, comprising a housing, loudspeaker system output means for providing a loudspeaker sound output to at least one loud-speaker system
a display
means for providing at least a first channel or at least a second channel as the loud-speaker sound output
said computing device being characterized in that
the housing is dimensioned to be handheld by a user
and that it comprises
    selection means for selecting one of the first and second channel
    control means comprising an input means for controlling at least one characteristic of the selected channel selected from the group of bend and play-back speed
    cross-fading means for cross-fading between the first and the second channel independently of the selected channel, said cross-fading means enabling cross-fading by using one input means.

The object is also achieved by a method for using disc-jockey functionalities on a hand-held computing device, having a display, a control means, a cross-fade input device, and a loudspeaker system output device, said method comprising the steps of
    selecting one channel of a first and a second channel to be controlled by the control means,
    activating the control means in a first or second direction to control at least one characteristic of at least a first track on at least a first channel.

By enabling control of both channels and of both the loud-speaker system output and the headphones output by means of the same control devices, a small hand-held device can be achieved.

In a preferred embodiment, the input means is a rotational input device on which at least one finger can be moved in a clockwise direction or a counter-clockwise direction for controlling the at least one characteristic. In this way the control function is not limited by the input device, for example by the finger reaching one end of the input device.

The selecting means may be arranged for selecting the channel by means of the display, by means of at lest one channel selection button or by any other conceivable method.

Preferably, the control means comprises a play-back speed control mode switch for enabling play-back speed control (often referred to as pitch control) using the input means.

The cross-fading means preferably enables cross-fading from one channel to the other by moving one finger from one side to another side to cross-fade from the first channel to the second channel Normally, the computing device further comprises headphones output means for providing a headphones sound output to at least one headphone independently of the loud-speaker sound output, and a headphone control mode switch for enabling control of the headphones sound output by means of the control means and/or the cross-fade input device. This will enable the disc-jockey to listen to one track which is not played through the loudspeaker system, for example to adjust the playback speed to the track currently being played on the loudspeaker to make a seamless transition between two tracks.

The possibility to compress audio and moving picture files and the development of low cost flash memories have made it possible to build small, energy efficient audio players called Digital Audio Players (DAP). In the beginning they were all based on the so called Flash Memory technology and they could not store more than around 500 audio files. The development of very small hard disks then provided a capacity of storing several thousands of audio files. The technology has evolved further and the computing power of the energy efficient micro controllers has increased to the point that it now is possible to execute computing intensive tasks concurrently. The present invention makes use of this recent technical development to achieve a small DJ equipment that is easy to handle.

DETAILED DESCRIPTION OF EMBODIMENTS

Figure 1:
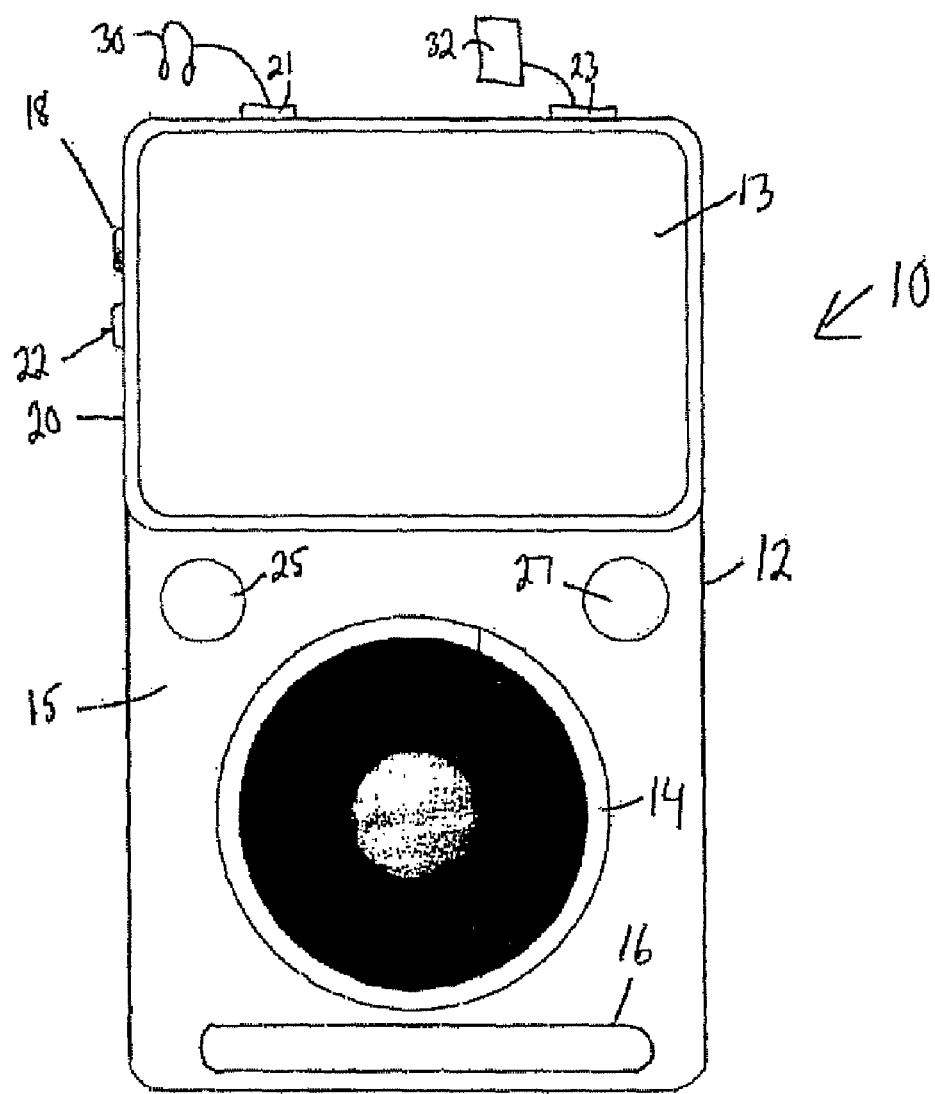
FIG. 1 is a schematic top view of a computing device according to the present invention

With reference to FIG. 1, the computing device 10 of the present invention has a housing 12 that is dimensioned to be hand-held by a user such as a disc-jockey. The computing device may be any suitable digital media player such as an MP3-player. It should be understood that the device 10 could be used by any user and the disc-jockey is only to be seen as an illustrative example.

In general, the device 10 has two channels, which makes it possible to play two audio tracks concurrently, so that the disc-jockey can almost seamlessly transfer the music the audience hears from one track, played on one channel, to the next track, played on the other channel.

The device is also able to produce two audio outputs, one headphones outlet 21 for listening through headphones 30 worn by the disc-jockey, and one loudspeaker system outlet 23 for the output to a loudspeaker system 32 for the audience. In this way, it is possible for the disc-jockey to listen to an audio track in headphones while another is playing in the loudspeaker system to make sure the new track that is coming up is in line with the music plan of the disc-jockey.

The device has a display 13 on a front side 15, above an input device 14 of the housing. The input device 14 is preferably a rotational input device having a circular form that enables control by a rotational movement of the user's finger on the input device 14. In the default mode the input device 14 is used to control the bend of the selected channel. A pitch control mode switch 18 is disposed at a side 20 of the housing 12. When the pitch control mode switch 18 is pressed the input device 14 controls the playback speed of the selected channel.

The device 10 also comprises a cross-fader input device 16 used to control the cross-fading between the channels, a play/pause button 25 and a cue button 27. The function of the control inputs 14, 16, 18, 25, 27 will be discussed in more detail below. By default, the control inputs on the device 10 are used to control the selected channel and the cross-fader input device 16 the loudspeaker system outlet. According to a preferred embodiment a first channel selection button for selecting the first channel and a second channel selection button for selecting the second channel are also included. Alternatively, only one channel selection button can be provided, in which case pressing the button always changes the channel to the one that is currently not selected.

To enable control of the headphone outlet, a headphone control mode switch button 22 is preferably disposed at a side 20 of the housing 12. When the headphone control mode switch button 22 is pressed, the input device 14 will control the headphone volume and the cross-fade input will control the headphone cross-fade. When the headphone control mode switch button 22 is released the device will return to default mode in which the bend of the selected channel and the cross-fade of the loudspeaker system output can be controlled. From this mode, the pitch control mode can be reached by pressing the pitch control mode button 18.

The play/pause button 25 and the cue button enable the playback to be controlled, that is, paused or cued. When a track is playing and the play/pause button 25 is pressed, the track will immediately start to loop around the current playback position which produces a short and repeated sound corresponding to the sound at the current playback position. Also, when a track is playing and the play/pause button is pressed, the input device 14 is used for scrolling the playback position of the track. When a track is paused and the play/pause button 25 is pressed, the track starts to play normally and the rotational input 14 is returned to its default usage. Also, when a track is paused and the cue button 27 is pressed the loop around the current play-back position is stopped, i.e. the repeated and short sound is silenced and the current playback position is set as the current cue point. If the cue button 27 has been pressed and the play/pause button 25 is pressed the tracks start to play normally from the set cue point. If the cue button is pressed when the track is playing, play-back is stopped and the playback position is set to the current cue point.

In the default mode the input device 14 is preferably used for bending up and bending down functions. In order to make the transition between two tracks seamless the disc-jockey can manipulate the speed of the playback of both tracks being played on the device. The playback speed can be ramped up (bent up) or slowed down (bent down) according to calculations carried out by the device 10 based on inputs from the disc-jockey. If the input device 14 is a rotational input device 14 the disc-jockey may rotate the rotational input 14 in a clockwise direction to bend up the track and in a counter-clockwise direction to bend down the track. The device 10 uses the rotational direction of the disc-jockey's fingers on the input device 14 and the rotated distance, speed and acceleration to calculate how to affect the playback of the track affected by the input 14. For example, a more rapid change of the speed is accomplished by moving the finger very quickly on the input device 14. After there is no additional input from the disc-jockey, the playback returns to the original speed according to calculations performed by the device.

The disc-jockey may press the pitch control mode switch button 18 to activate the playback speed manipulation functionality, often called pitch. That is, the playback speed can be changed by the disc-jockey permanently, that is, in such a way that it will not change until another input is recorded by the device, or until a new audio track is loaded which sets the playback speed to the default value for that track.

When the pitch control mode switch button 18 is pressed, the rotational input device 14 is used to control the playback speed of the tracks. By rotating the rotational input clockwise, the playback speed may be increased and by rotating the rotational input counter-clockwise the playback speed may be decreased. Also, when the pitch control mode switch button 18 is pressed, the display 13 displays a special screen showing the current playback speed value of the currently played audio track of the selected channel. When the disc-jockey changes the playback speed value the display 13 is updated with the new value to give feedback to the disc-jockey. The button 18 is preferably located on the upper left side of the housing 12 to make it easy for the disc-jockey to activate the playback speed manipulation functionality by using the left hand thumb or, in the case of a left-handed disc-jockey, with the fingers of the right hand.

To activate the cross-fade function for the lineout output, that is, the transition from the track of the first channel to the track of the second channel, the disc-jockey may use the cross-fade input 16 on the front side of the device located just below the input device 14. By sliding the finger all the way to the left or right, the disc-jockey sets the audio output to be either the first channel or the second channel. This activates software that controls the mix of the output between the first channel and the second channel. Everything in between these extremes means that the audio output consists of a mix of the tracks of the two channels. When the cross-fade input 16 is activated or touched, the device displays a special screen on the display 13 showing the current position of the cross-fade of the lineout output. When the disc-jockey changes the values, the display is updated with the new values to give feedback to the disc-jockey. As stated above, in the default mode, the cross-fade input 16 controls the cross-fade on the loudspeaker system outlet 23. When the headphone control mode switch 22 is pressed, the cross-fade input 16 controls the cross-fade on the headphones outlet 21.

When the headphone control mode switch button 22 is pressed, the display 13 displays a special screen showing the current headphone volume. The display 13 also shows the current position of the headphone cross-fade. When the disc-jockey changes the values, the display 13 is updated with the new values to give feedback to the disc-jockey. The button 22 is preferably located on the upper left side of the housing 12 to make it easy for the disc-jockey to activate it using the left-hand thumb or, in the case of a left-handed person, with the fingers of the right hand.

Thus, in a preferred embodiment, all functions of the device 10 can be controlled using one hand.

In practice, the disc-jockey may start a track on the first channel that goes out to the loudspeaker system 32, then start another track on the second channel, and then press and hold the headphone control mode switch button 22 so that the cross-fade input is used to change the headphone cross-fade from the first channel to the second channel. The disc-jockey is then listening to a second track, that is going to be played after the first track which is currently played through the loudspeaker. Also, when the headphone control mode switch button 22 is activated the rotational input device 14 will control the headphone volume so that the disc-jockey can set the headphone volume to an appropriate volume. The disc-jockey can then temporarily adjust the phase of the beat rate of the second track the disc-jockey is hearing in the headphones to match the phase of the beat rate of the first track by bending up or bending down the beat rate of the second track so that the transition from the beat rate of the first track can be seamlessly transformed into the beat rate of the second track. As indicated above, this may be done by touching the input device 14 and moving the finger in the clockwise direction to bend up or in the counter-clockwise direction to bend down.

In this way the phase of the beat rate of the second track is synchronized with the phase of the beat rate of the first track to prevent the beat rate of the first track and the beat rate of the second track to be too far away from each other as the second track is cross-faded in and the first track is cross-faded out. The synchronization of the beat rates is preferably done over the headphones so the audience does not hear the bending up or down of the second track. The speed of the finger determines how much the beat rate is temporarily increased or decreased.

The disc-jockey can also change the beat rate of the second track permanently, to match the beat rate of the first track better. As stated above, this is done using the input device 14 while pressing the pitch control mode switch button 18. In other words, the disc-jockey can increase or decrease the beat rate of the second track to match the beat rate of the first track to make the transition more seamless and so that the audience does not have to change the dancing rhythm when the second track is being cross-faded into the loudspeaker system.

A channel must be selected in order to perform playback speed manipulation or bend on a track. This is preferably done in a graphical user interface displayed on the display 13, which enables the disc-jockey to switch between the first channel and the second channel by scrolling and selecting the desired channel. Whenever the disc-jockey switches from one channel to another channel, the default of the device 14 is the bend function. The disc-jockey must press and hold the pitch control mode switch button 18 to switch the device 14 from the bend mode to the playback speed manipulation mode. As long as the disc-jockey has activated the first channel the graphical user interface displays information that relates to the first channel even if the disc-jockey uses the cross-fade device to change to the second track on the second channel. This means that the cross-fade device 16 can be used to switch the tracks regardless of whether the graphical user interface is displaying information about the first or the second channel. When a track is to be selected, the function of the rotational input device 14 is transformed to provide a scroll function so that the disc-jockey can locate and retrieve tracks from the hard disc or any other suitable memory or storage medium while the device 10 is in the first or second channel mode.

While the audience is listening to the first track on the first channel, the disc-jockey can activate the second channel on the graphical user interface on the display 13 to locate a suitable track on the hard drive or any other storage medium of the device 10 and then perform the required bend and playback speed manipulation functions as described above.

Often, the disc-jockey uses both the bend and playback speed manipulation functions to synchronize two tracks perfectly prior to making the transition from the first track to the second track on the loudspeaker system. It may be possible to display the beat rate for both tracks to make it easier for the disc-jockey to match the beat rate of the two tracks.

Figure 2:
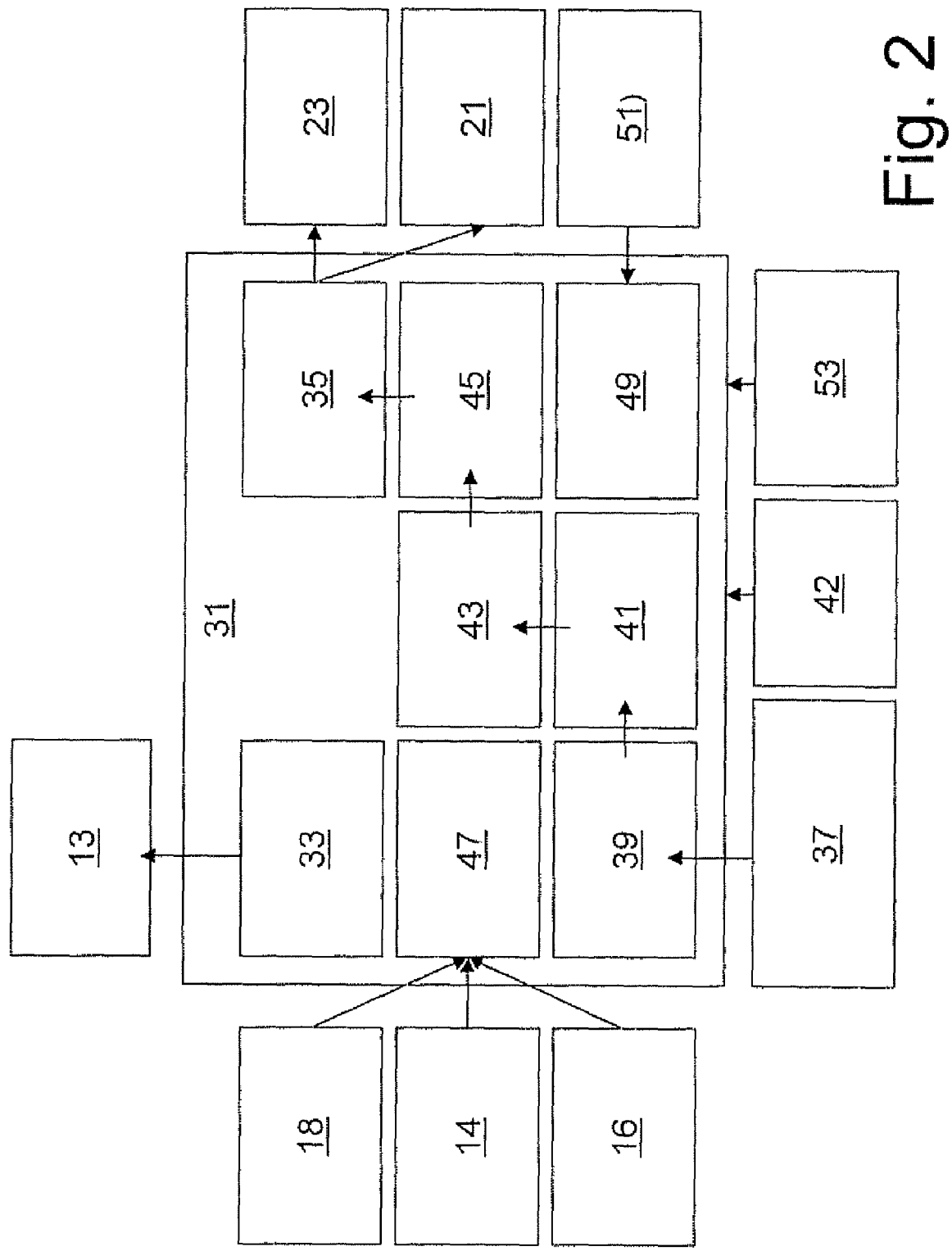
FIG. 2 is a schematic block diagram of the computing device according to the present invention.

FIG. 2 is a logical block diagram of a disc-jockey device according to the invention. As stated above, the functions of the DJ device are implemented in software stored in the device and controlled by means of the control input devices 14, 16, 18, 22, 25 and 27.

The device comprises a central processor unit CPU 31 comprising means for controlling the functions of the device. In particular, the CPU 31 comprises display control functions 33 for controlling the display and output mixing functions 35 for controlling the output to the loudspeaker system outlet 23 and the headphones outlet 21.

The music tracks that are to be played are stored in a persistent memory unit 37, such as a hard disk or a memory chip or any other appropriate storage means, which is connected to the CPU. The programs used by the various units of the CPU are also stored in the persistent memory unit 37. An audio data decompression unit 39 in the CPU 31 receives the music files to be played from the memory unit 37, decompresses them and forwards to a playback speed control unit 41, usually through storage in a Random Access Memory (RAM) 42. After the playback speed control unit 41 the music file is temporarily stored in RAM 42 again, and are equalized in an audio equalization and volume unit 43 from which it is forwarded to an audio loop processing unit 45 and then through the output mixing unit 25. The units 39, 41, 43, 45 and 35 are known per se.

A user input processing unit 47 receives input from the input buttons 18, 22, 35, 37, from the input device 14 and from the cross-fader 16. If channel selection buttons are available, the user input processing unit 47 receives user input from them as well.

The user input processing unit in turn controls the following control units in dependence of the user input:
1. playback speed control.
2. audio equalisation and volume,
3. audio loop processing,
4. output mixing Further, an accessory management unit 49 may be arranged to handle connections to other devices, such as a USB connection 51.

The Random Access Memory (RAM) 42 is provided for temporary storage of variables, music files that are currently being played, and other information that require quick access.

Preferably, the device is powered from a rechargeable battery 53. Alternatively or in addition to this, power may be supplied from another type of battery, or from the mains.

The device may also be adapted to wireless communication so that the disc-jockey can even be among the dancing audience and participate in the dancing while manipulating the various tracks on the device 10.

The device 10 may also be provided with a suitable digital connection 34, such as on the back or any other suitable place, to enable the device to be connected to computers, accessories and other digital equipment for the exchange of data.

To make the device 10 stable a layer of a material having high friction may be applied to at least an area of the back of the device, so that it will not be prone to move when lying on a smooth surface.

While the present invention has been described in accordance with preferred compositions and embodiments, it is to be understood that certain substitutions and alterations may be made thereto without departing from the scope of the claims.

The invention claimed is:

1. A hand-held computing device with built-in disc-jockey functionality, comprising:
   a hand-held housing;
   a loud speaker output on the housing for providing a sound output for connection to at least one loud speaker system;
   a display on the housing;
   at least one user manually activated channel selection input on the housing for selecting at least one of at least first and second channels;
   a user manually activated mode selection input on the housing for selecting either a bend mode or a pitch mode for adjusting a bend or a pitch for the at least one channel selected by the user, said bend mode temporarily changing a playing speed of the selected channel to synchronize a beat of the selected channel to a beat of the other channel, and when there is no additional further input adjustment by the user for the bend mode the speed of the selected channel automatically returning to an original speed, and said pitch mode permanently changing a playing speed of the selected channel to a playing speed of the other channel until a new input adjustment is provided in the pitch mode for changing the pitch of the selected channel;
   only one user manually activated magnitude input device on the housing for manually adjusting a magnitude of the bend or a magnitude of the pitch for the selected bend mode or pitch mode; and
   only one user manually activated cross-fading input on the housing for manually adjusting a cross-fading between the first and the second channels independently of which of the channels is selected.

2. The computing device according to claim 1 further comprising a head phones output on the housing for providing a head phones sound output for connection to at least one head phone independently of the loud speaker sound output.

3. The computing device of claim 2 wherein a user manually activated head phones mode selection input is on said housing for enabling control of the head phones sound output by the magnitude input device or by the cross-fading input.

4. The computing device according to claim 1 wherein the magnitude input comprises a rotational input device on which at least one finger can be moved in a clockwise direction or a counter-clockwise direction for controlling the magnitude.

5. The computing device according to claim 1 wherein the display illustrates the channels being selected by the channel selection input device.

6. The computing device according to claim 1 wherein the channel selection input comprises a button.

7. The computing device according to claim 1 wherein the channel selection input comprises two buttons provided for selecting the respective first and second channels.

8. The computing device according to claim 1 wherein the mode selection input comprises a button which when activated changes operation of the device from the bend mode to the pitch mode.

9. The computing device according to claim 1 wherein said cross-fading input is a device having a linear shape and is arranged to enable cross-fading from one channel to the other channel by moving one finger along the cross-fading input device.

10. The computing device according to claim 1 wherein the housing and all of said user manually-activated inputs are arranged in such a way as to enable control of all functions using one hand.

11. The computing device according to claim 1 wherein a back of the housing comprises at least one area having a high friction.

12. A method for using disk-jockey functionalities on a hand-held computing device, said device comprising
   a hand-held housing,
   a loud speaker output on the housing for providing a sound output for connection to at least one loud speaker system,
   a display on the housing,
   at least one user manually activated channel selection input on the housing,
   a user manually activated mode selection input on the housing,
   only one user manually activated magnitude input on the housing, and
   only one user activated cross-fading input on the housing, said method comprising the steps of:
   with said channel selection input manually selecting at least one of at least first and second channels;
   with said mode selection input manually selecting either a bend mode or a pitch mode for adjusting a bend or a pitch for the at least one channel selected by the user, said bend mode temporarily changing a playing speed of the selected channel to synchronize a beat of the selected channel to a beat of the other channel, and when there is no additional further input adjustment by the user for the bend mode the speed of the selected channel automatically returning to an original speed, and said pitch mode permanently changing a playing speed of the selected channel to a playing speed of the other channel until a new input adjustment is provided in the pitch mode for changing the pitch of the selected channel;

with said magnitude input manually adjusting a magnitude of the bend or a magnitude of the pitch by the user for the selected bend mode or pitch mode; and using said cross-fading input manually adjusting a magnitude of the cross-fading between the first and the second channels independently of which of the channels is selected.

13. The method according to claim 12 further comprising a head phones output on the housing for providing a head phones sound output for connection to at least one head phone independently of the loud speaker sound output.

14. The method of claim 13 wherein a user manually activated head phones mode selection input is on said housing for enabling control of the head phones sound output by the magnitude input or by the cross-fading input.

15. The method according to claim 12 wherein the magnitude input comprises a rotational input device on which at least one finger is moved in a clockwise direction or a counter-clockwise direction for controlling the magnitude.

16. The method according to claim 12 wherein the display illustrates the channels being selected by the channel selection input.

17. The method according to claim 12 wherein the channel selection input comprises a button.

18. The method according to claim 12 wherein the channel selection input comprises two respective buttons for selecting the respective first and second channels.

19. The method according to claim 12 wherein the mode selection input comprises a button which when activated changes operation of the device from the bend mode to the pitch mode.

20. The method according to claim 12 wherein said cross-fading input is a device having a linear shape and is arranged to enable cross-fading from one channel to the other channel by moving one finger along the cross-fading input device.

21. The method according to claim 12 wherein the housing and all of said user manually-activated inputs are arranged in such a way as to enable control of all functions using one hand of the user.

* * * * *